(12) United States Patent
Misawa

(10) Patent No.: US 7,692,693 B2
(45) Date of Patent: Apr. 6, 2010

(54) IMAGING APPARATUS

(75) Inventor: Takeshi Misawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 912 days.

(21) Appl. No.: 11/341,635

(22) Filed: Jan. 30, 2006

(65) Prior Publication Data

US 2006/0170802 A1   Aug. 3, 2006

(30) Foreign Application Priority Data

Jan. 31, 2005   (JP)   ............................. 2005-023597
Jan. 31, 2005   (JP)   ............................. 2005-023893
Sep. 22, 2005   (JP)   ............................. 2005-276047

(51) Int. Cl.
*H04N 5/235*   (2006.01)

(52) U.S. Cl. ..................... 348/229.1; 348/294; 348/364

(58) Field of Classification Search ............ 348/207.99, 348/221.1, 223.1, 229.1, 275, 294, 297, 315, 348/340, 362, 364; 358/909.1
See application file for complete search history.

(56) References Cited

U.S. PATENT DOCUMENTS 5,712,682 A * 1/1998 Hannah ...................... 348/255
6,831,692 B1 * 12/2004 Oda ........................... 348/315
7,453,496 B2 * 11/2008 Suzuki ..................... 348/221.1
2001/0007473 A1 * 7/2001 Chuang et al. .............. 348/362
2004/0051790 A1 * 3/2004 Tamaru et al. ............ 348/223.1
2004/0085598 A1 * 5/2004 Kokeguchi et al. ........ 358/909.1
2004/0135899 A1 * 7/2004 Suemoto .................. 348/223.1
2004/0169751 A1 * 9/2004 Takemura et al. ........... 348/294
2005/0099508 A1 * 5/2005 Oda et al. ................. 348/229.1
2005/0151873 A1 * 7/2005 Murakami .................. 348/340

FOREIGN PATENT DOCUMENTS

JP   2003-218343 A   7/2003
JP   2004128562 A   *   4/2004

* cited by examiner

*Primary Examiner*—Lin Ye
*Assistant Examiner*—Dennis Hogue
(74) *Attorney, Agent, or Firm*—Birch, Stewart, Kolasch & Birch, LLP

(57) ABSTRACT

A CCD of a digital camera has high sensitive main pixels for depicting gradations in low and middle brightness portions of a subject, and low sensitive sub pixels for depicting gradations in high brightness portions of the subject. Main pixel image signals from the main pixels have a larger signal level than sub pixel image signals from the sub pixels. The main pixel image signals are attenuated by an attenuator to have the same signal level as the sub pixel image signals. The attenuated main pixel image signals and the sub pixel image signals are amplified by an amplifier with the same gain. The amplified main and sub pixel image signals are digitalized and composed to generate composite image data.

5 Claims, 11 Drawing Sheets

IMAGING APPARATUS

FIELD OF THE INVENTION

The present invention relates to an imaging apparatus that is provided with an imaging device having a plurality of main pixels and sub pixels, to take image signals from electric charges stored in the individual pixels, wherein the main pixels have a higher sensitivity than the sub pixels, so that the image signals from the main pixels represent gradations from low to middle brightness ranges well, and the image signals from the sub pixels represent gradations from a high brightness range well.

BACKGROUND ARTS

As an imaging apparatus with a solid state imaging device, such as CCD or CMOS, digital cameras have been widely used. The solid state imaging device is provided with a plurality of pixels that store or accumulate electric charges in accordance with the quantity of light incident on the individual pixel. The charges stored in the respective pixels are taken as analog image signals. Because the image signals have a low signal level at the output of the imaging device, they are amplified by an amplifier circuit in the digital camera. The amplified image signals are digitalized, and subjected to image processing, such as a gamma-correction, white-balance correction and an image quality correction. The processed digital image signals are written on a storage medium like a memory card.

The digital cameras have a disadvantage that their dynamic range is not sufficiently wide. This is because the pixels of the imaging device cannot store the electric charges any more after the stored amount reaches a saturation level, as shown in FIG. 12. As a result, so far as the subject brightness is so low that the charge storage amount is less than the saturation level, the charge storage amount corresponds to the subject brightness, so that the obtained image signal has a level corresponding to the subject brightness, enabling reproducing the tone in the image. But when the subject brightness is so high that the charge stored in the pixel reaches the saturation level, the pixel cannot store the charges any more and the image signal values of the saturated pixels stop at the maximum even through the subject brightness is higher. Then, corresponding image pixels look white and do not reproduce gradations in highlight portions of the subject, which is so-called clipped highlight.

To solve this problem, an imaging apparatus has been suggested for example in Japanese Laid-open Patent Application No. 2003-218343, that is provided with high sensitive main pixels and low sensitive sub pixels to widen the dynamic range by composing image signals from the main pixels and the sub pixels. As the main pixels are high sensitive, image signals from the main pixels have large values in a shorter exposure time, so they are suitable for reproducing gradations in a low brightness range. On the contrary, as the sub pixels are low sensitive, they would not instantly be saturated with charges even while the subject brightness is high, so they are suitable for reproducing gradation in a high brightness range. Therefore, composing the image signals from the main and sub pixels achieves a wider dynamic range.

Because the main pixels have a higher sensitivity than the sub pixels, image signals from the main pixels, hereinafter called the main pixel image signals, have larger signal values or a higher signal level than image signals from the sub pixels, hereinafter called the sub pixel image signals, when they are taken under the same conditions.

Since the prior imaging apparatus has only a signal amplifier, the main pixel image signals and the sub pixel image signals are amplified at the same gain, the rate of amplification. As a result, the sub pixel image signals are not sufficiently amplified while the gain is set at a value for amplifying the main pixel image signals to proper levels. If the gain is set at a value for amplifying the sub pixel image signals to proper levels, the main pixel image signals are excessively amplified.

SUMMARY OF THE INVENTION

In view of the foregoing, a primary object of the present invention is to provide an imaging apparatus that has a wider dynamic range and solves the above described problem.

To achieve the above and other objects, an imaging apparatus of the present invention comprises an imaging device that has high sensitive main pixels and low sensitive sub pixels, to take main pixel image signals from electric charges stored in the main pixels, and sub pixel image signals from electric charges stored in the sub pixels; a signal processing device that amplifies or attenuates the main pixel image signals and/or the sub pixel image signals, to put signal values of the main and sub pixel image signals substantially in the same range; and an image composition device for composing the main and sub pixel image signals, after being amplified or attenuated in the signal processing device, to generate composite image signals.

According to a preferred embodiment, the signal processing device comprises an attenuator for attenuating the main pixel image signals or the sub pixel image signals, to put signal values of the main and sub pixel image signals substantially in the same range; and an amplifier for amplifying the main and sub pixel image signals, after having the signal values put in the same range, with a predetermined gain.

Where the main pixels have a higher saturation level to store charges up to a larger amount than the sub pixels, the signal processing device attenuates the main pixel image signals by the attenuator.

According to another preferred embodiment, the signal processing device amplifies the main pixel image signals with a first gain and the sub pixel image signals with a second gain, the first and second gains are determined to put signal values of the main and sub pixel image signals substantially in the same range.

Where the main pixels have a higher saturation level to store charge up to a larger amount than the sub pixels, the first gain for amplifying the main pixel image signals is set smaller than the second gain for amplifying the sub pixel image signals.

The signal processing device may comprises a first amplifier for amplifying the main pixel image signals with the first gain and a second amplifier for amplifying the sub pixel image signals with the second gain.

The signal processing device may comprise an amplifier whose gain is variable so as to amplify the main pixel image signals with the first gain and the sub pixel image signals with the second gain.

Since the main pixel image signals and/or the sub pixel image signals are amplified or attenuated to put signal values of the main and sub pixel image signals substantially in the same range, both kinds of image signals may be amplified to a proper level.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1A:
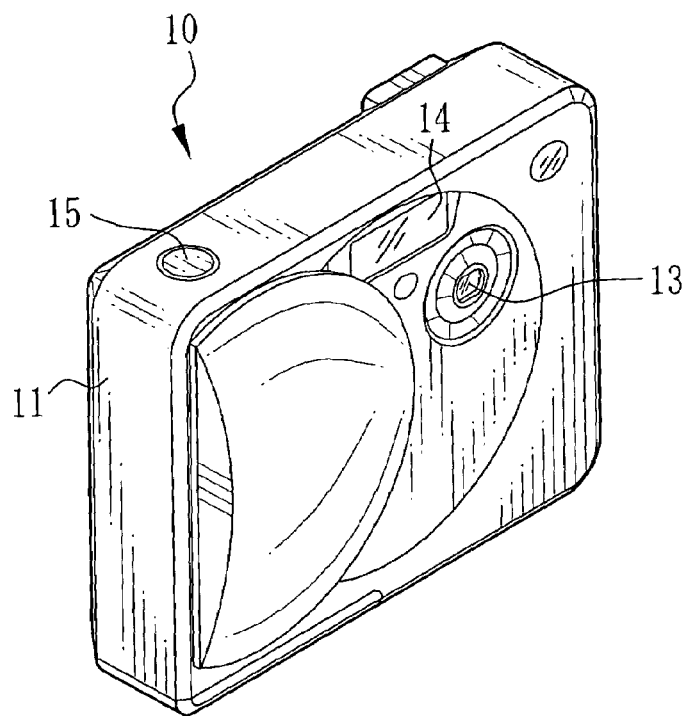
FIGS. 1A and 1B are front and rear perspective views of a digital camera embodying the present invention.
Figure 1B:
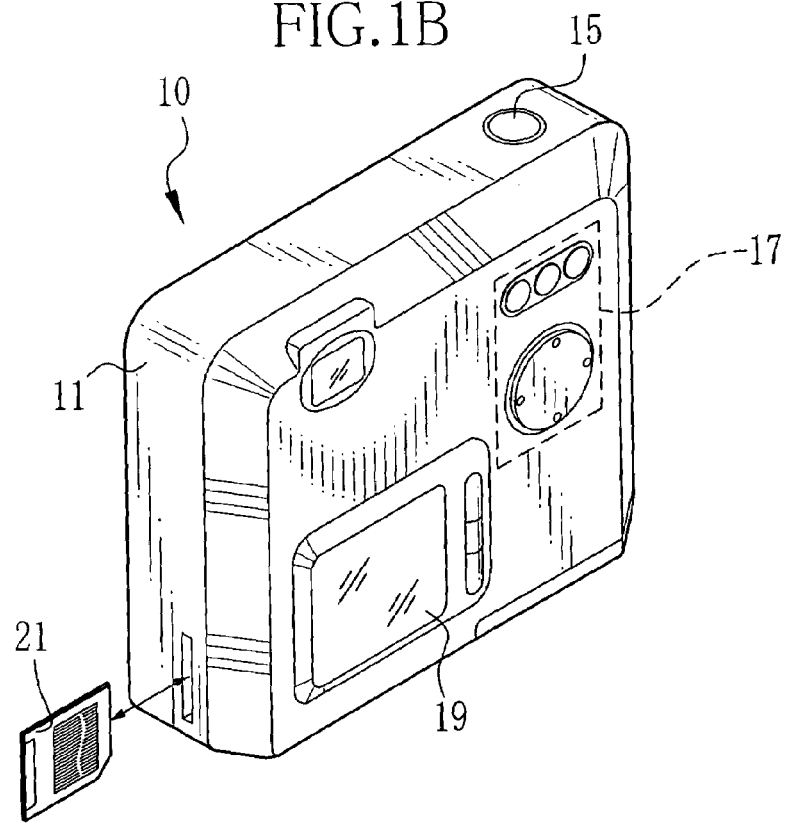

As shown in FIG. 1, a digital camera 10 has a camera body 11 provided with a taking lens 13 and a flash projector 14 on its front, a shutter button 15 on its top. A manipulating section 17 having a zoom button, a mode selection button, a power switch button and a cursor button with four buttons arranged in a cross, and an LCD 19 are disposed on a back of the camera body 11. A memory card 21 may be put in one side of the camera body 11, for writing image data captured by the digital camera 10.

The digital camera 10 may be set in an imaging mode, a reproduction mode or a menu mode by handling the manipulating section 17. The user can capture images in the imaging mode, check captured images in the reproduction mode, and set up various items.

Figure 2:
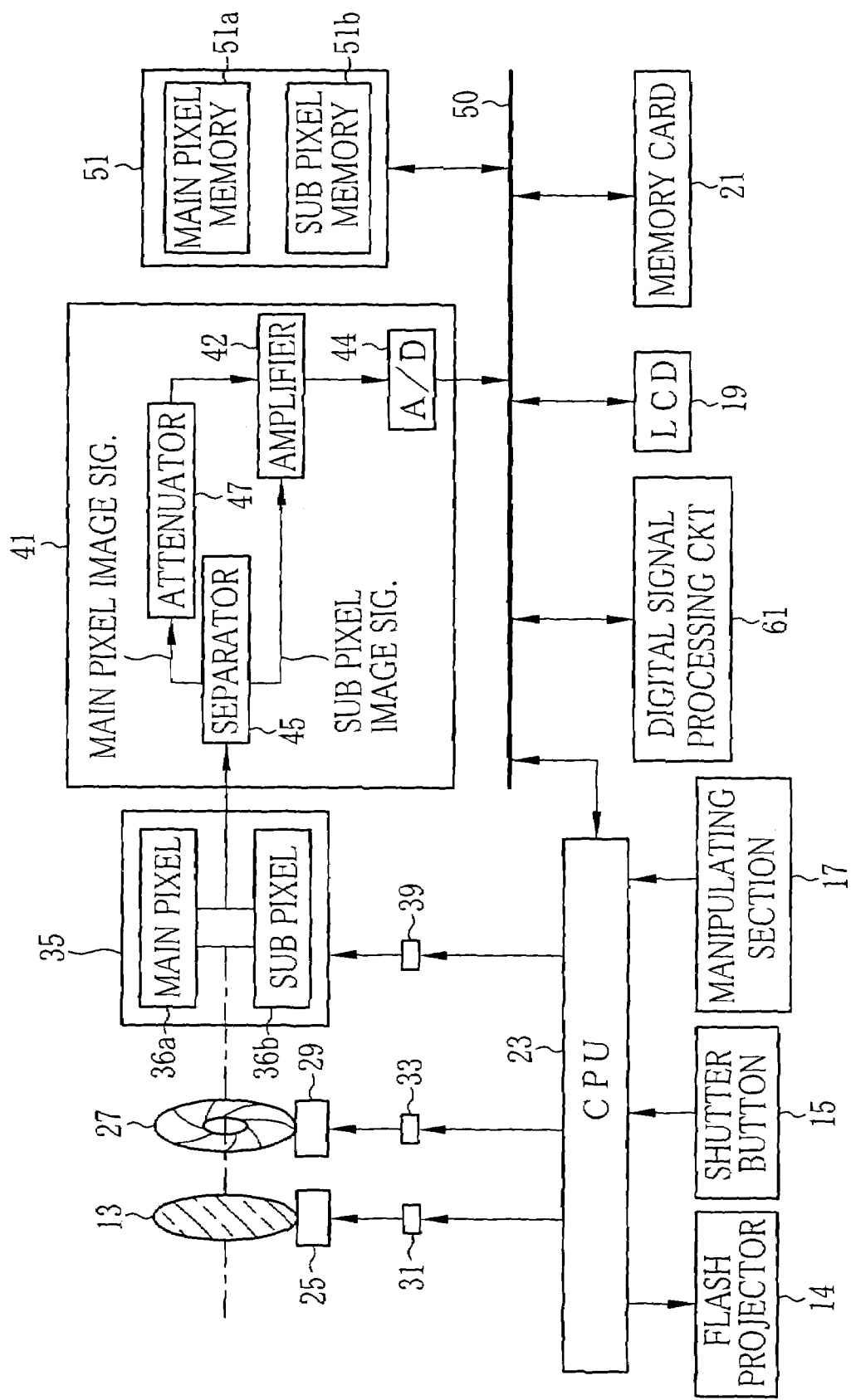
FIG. 2 is a block diagram illustrating a structure of the digital camera.

As shown in FIG. 2, respective components of the digital camera 10 are totally controlled by a CPU 23 in response to signals entered through the shutter button 15 and the manipulating section 17.

The taking lens 13 is driven by a lens drive mechanism 25 including a motor, to change its optical magnification rate and focal point. A stop 27 is driven by a stop drive mechanism 29 including a motor, to change its aperture size. The lens drive mechanism 25 and the stop drive mechanism 29 are driven respectively by motor drivers 31 and 33 under the control of the CPU 23.

Figure 3:
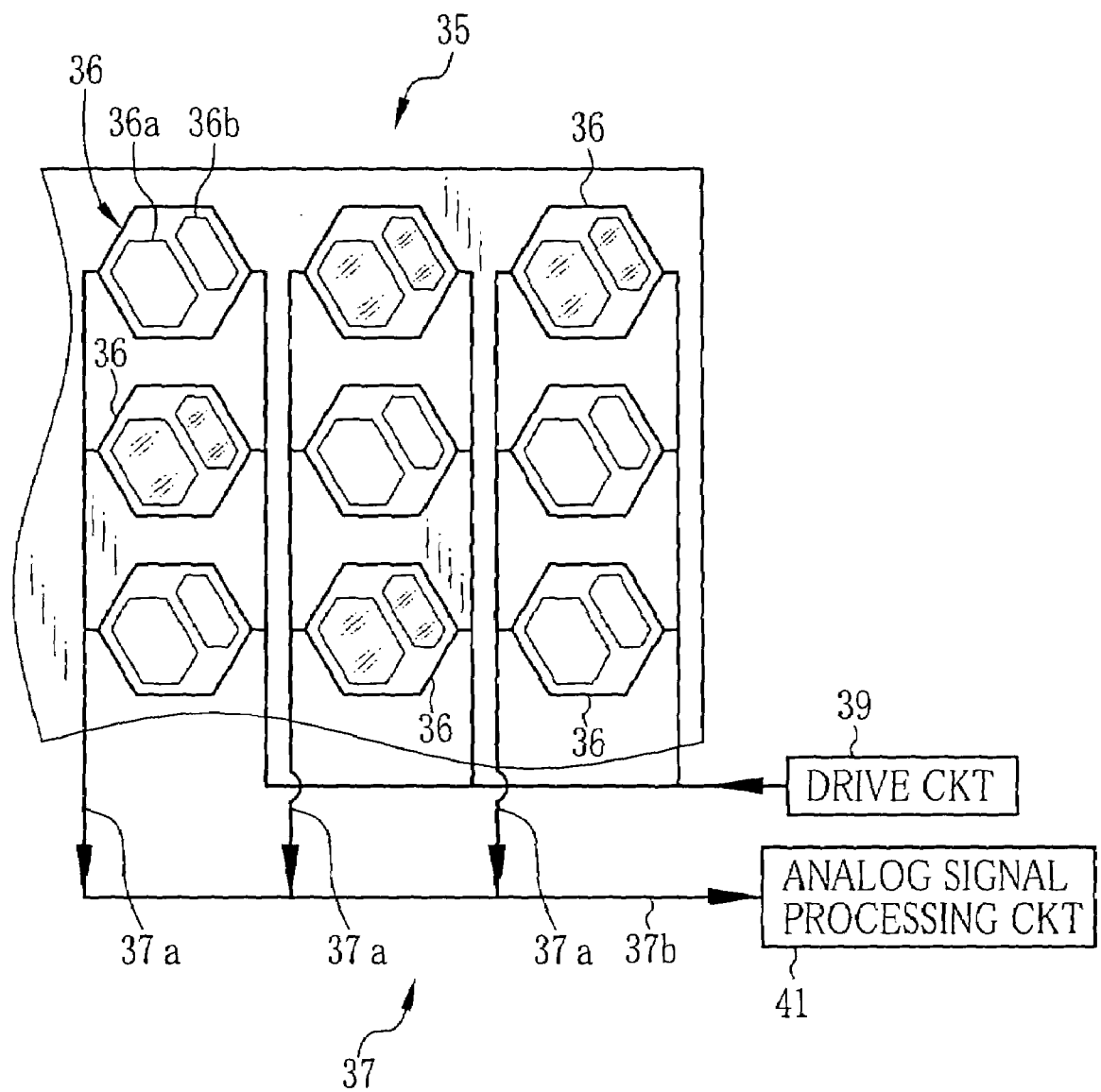
FIG. 3 is an explanatory diagram schematically illustrating a structure of a CCD having main pixels and sub pixels.

A CCD image sensor 35 as an imaging device is placed behind the stop 27. As shown in FIG. 3, the CCD 35 has a plurality of pixels 36 arranged in an array. One pixel 36 consist of a main pixel 36a and a sub pixel 36b of a smaller light receiving area than that of the main pixel 36a. The main and sub pixels 36a and 36b are photo sensors that convert received light into electric signals by accumulating electric charges in correspondence with the quantity of the received light.

Figure 4:
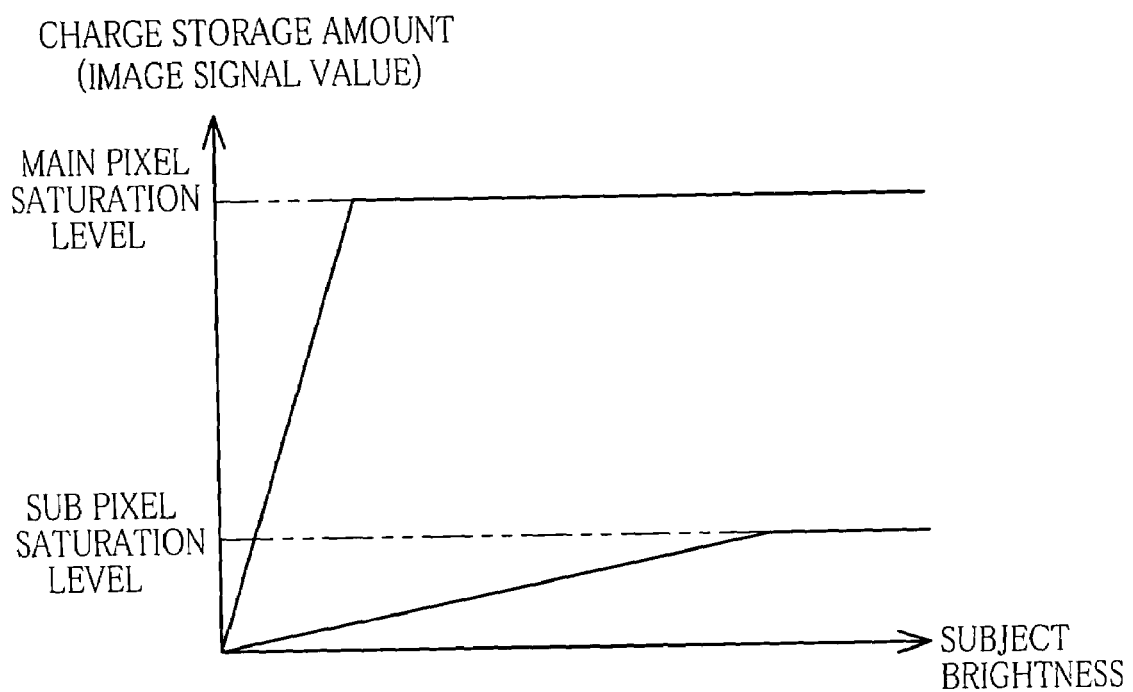
FIG. 4 is a graph illustrating differences in sensitivity and saturation level between the main pixel and the sub pixel.

The main pixels 36a are different in sensitivity and saturation level from the sub pixels 36b. In this embodiment, the sensitivity of the main pixels 36a is 16 times that of the sub pixels 36b, and the saturation level of the main pixels 36a is four times that of the sub pixels 36b, as shown in FIG. 4. The main pixels 36a are used for depicting gradations in low to middle brightness ranges, whereas the sub pixels 36b are used for depicting gradations in a high brightness range where the main pixels 36a reach their saturation level and cannot depict the gradations.

Referring back to FIG. 3, the pixels 36 are connected to a drive circuit 39. The drive circuit 39 outputs an electronic shutter signal, upon which the charges stored in the pixels 36 are swept out, and a read signal, upon which the stored charges are transferred through transfer paths 37. The electronic shutter signal and the read signal are generated at timings controlled by the CPU 23, and are applied to the main pixels 36a independently of the sub pixels 36b, so that the main pixels 36a and the sub pixels 36b are driven independently from each other.

When the electronic shutter signal is applied to the main pixels 36a, charges unnecessarily stored in the main pixels 36a are cleared off, to start imaging through the main pixels 36a. Then, the main pixels 36a start accumulating charges whose amount is proportional to the subject brightness and the time of exposure. When a given exposure time is over, the read signal is applied to the main pixels 36a, so the charges accumulated in the respective main 36 are transferred vertically through vertical transfer paths 37a and, thereafter, transferred line by line in a horizontal direction through a horizontal transfer path 37b, to collect them as main pixel image signals.

In the same way, imaging through the sub pixels 36b is carried out upon the electronic shutter signal being applied to the sub pixels 36b. Thereafter when the read signal is applied to the sub pixels 36b, the charges accumulated in the sub pixels 36b are transferred and collected as sub pixel image signals.

The main pixel image signals as well as the sub pixel image signals are fed to an analog signal processing circuit 41. As shown in FIG. 2, the analog signal processing circuit 41 includes an amplifier 42 and an A/D converter 44. The amplifier 42 amplifies the main and sub pixel image signals at a predetermined gain. The A/D converter 44 converts the amplified main and sub pixel image signals into a digital form. Thereby, the charges constituting the main pixel image signals and the charges constituting the sub pixel image signals are converted into tonal values, generating main pixel data and sub pixel data, which represent total values of the respective pixels.

Since the sensitivity and the saturation level of the main pixels 36a are higher than the sub pixels 36b, the main pixels 36a can store more charges in shorter time than the sub pixels 36b, as show in FIG. 4. Accordingly, the main pixel image signals have a higher signal level than the sub pixel image signals. If the main pixel image signals are amplified with the same gain as for the sub pixel image signals, the differences in signal level between the main pixel image signals and the sub pixel image signals are enhanced by the amplification. As a result, if the gain is set at a value to amplify the main pixel image signals to a suitable level, the sub pixel image signals will be insufficiently amplified. On the contrary, if the gain is set at a value to amplify the sub pixel image signals to a suitable level, the main pixel image signals will be excessively amplified.

To solve this problem, the analog signal processing circuit 41 is provided with a separator 45 and an attenuator 47. The separator 45 is connected directly to an output of the CCD 35, to discriminate the image signals output from the CCD 35 between the main pixel image signals and the sub pixel image signals, and separate them. The sub pixel image signals are sent directly to the amplifier 42, whereas the main pixel image signals are fed to the attenuator 47.

The attenuator 47 attenuates the main pixel image signals to have the same signal level as the sub pixel image signals. As described above, the saturation level of the main pixels 36a is four times that of the sub pixels 36b, so the main pixel image signals may have signal values which spread in a range that is four times wider than that of signal values of the sub pixel image signals. Therefore, in the present embodiment, the attenuator 47 attenuates the main pixel image signals to one fourth the original, on the assumption that the signal level of the main pixel image signals is four times that of the sub pixel image signals. Through this attenuation, the signal values of the main pixel image signals converge into approximately the same range as the signal values of the sub pixel image signals. The attenuated main pixel image signals are fed to the amplifier 42.

Since the main pixel image signals having a larger signal level are attenuated to equalize the signal level of the main and sub pixel image signals, the signal levels of the two kinds of image signals will not differ from each other if they are amplified with the same gain. Accordingly, the both kinds image signals can be amplified up to an adequate level by use of the same gain. The adequate signal level varies depending upon the camera specifications. But it is well known that the influence of noises in the following processes get smaller as the image signals have the larger signal level. Therefore, the gain is so determined as to amplify the image signals sufficiently enough to make noise components ineffective, insofar as the amplified image signals can be processed in the following sections, including the A/D converter 44, later-described frame memory 51 and digital signal processing circuit 61.

When the digital camera 10 is set in the imaging mode, the CPU 23 drives the CCD 35 to start shooting camera-through images. The camera-through images are displayed on the LCD 19 in a real time fashion, so that the LCD 19 functions as an electronic viewfinder. Because the camera-through images are used for framing, the pixel number is reduced for shooting the camera-through images. When an image capturing command is entered by pressing the shutter button 15 in the imaging mode, the shooting of the camera-through images is interrupted, and a main shooting for capturing an image to record is executed. After the main shooting is accomplished, the shooting for the camera-through images is restarted. During the shooting for the camera-through images and the main shooting, the main and sub pixel images taken through the CCD 35 are fed to the analog signal processing circuit 41, and converted into the main pixel data and the sub pixel data. The main and sub pixel data are output through a data bus 50 to the frame memory 51.

The frame memory 51 is a work memory used for processing the image data in the digital signal processing circuit 61, and stores the image data temporarily. The frame memory 51 includes a main pixel memory 51a and a sub pixel memory 51b for storing the main pixel data and the sub pixel data respectively.

The digital signal processing circuit 61 processes the image data as stored in the frame memory 51 for image-processing such as gamma correction, white-balance correction and image quality correction. Thereafter, the digital signal processing circuit 61 performs image composing of the main and sub pixel data, wherein the tonal value of each pixel of the main pixel data is synthesized with the tonal value of the same or corresponding pixel of the sub pixel data. Thereby, composite image data is generated.

Since the main pixels 36a are high sensitive and output larger signal values in a shorter exposure time as compared to the sub pixels 36b, the main pixel image signals are useful for depicting fine gradations of a low brightness subject. But the main pixels 36a will be soon charged up to the saturation level toward a high brightness subject. On the contrary, as the sub pixels 36b is low sensitive, the charges will not reach the saturation level even while the subject brightness is high. So the sub pixels 36b have a wider dynamic range. Therefore, composing the main and sub pixel data permits reproducing subtle gradations in the low brightness range and achieves a wider dynamic range as well. The composite image data is used for displaying the camera-through images on the LCD 19 during the shooting for the camera-through images, or written on the memory card 21 during the main shooting.

Figure 5:
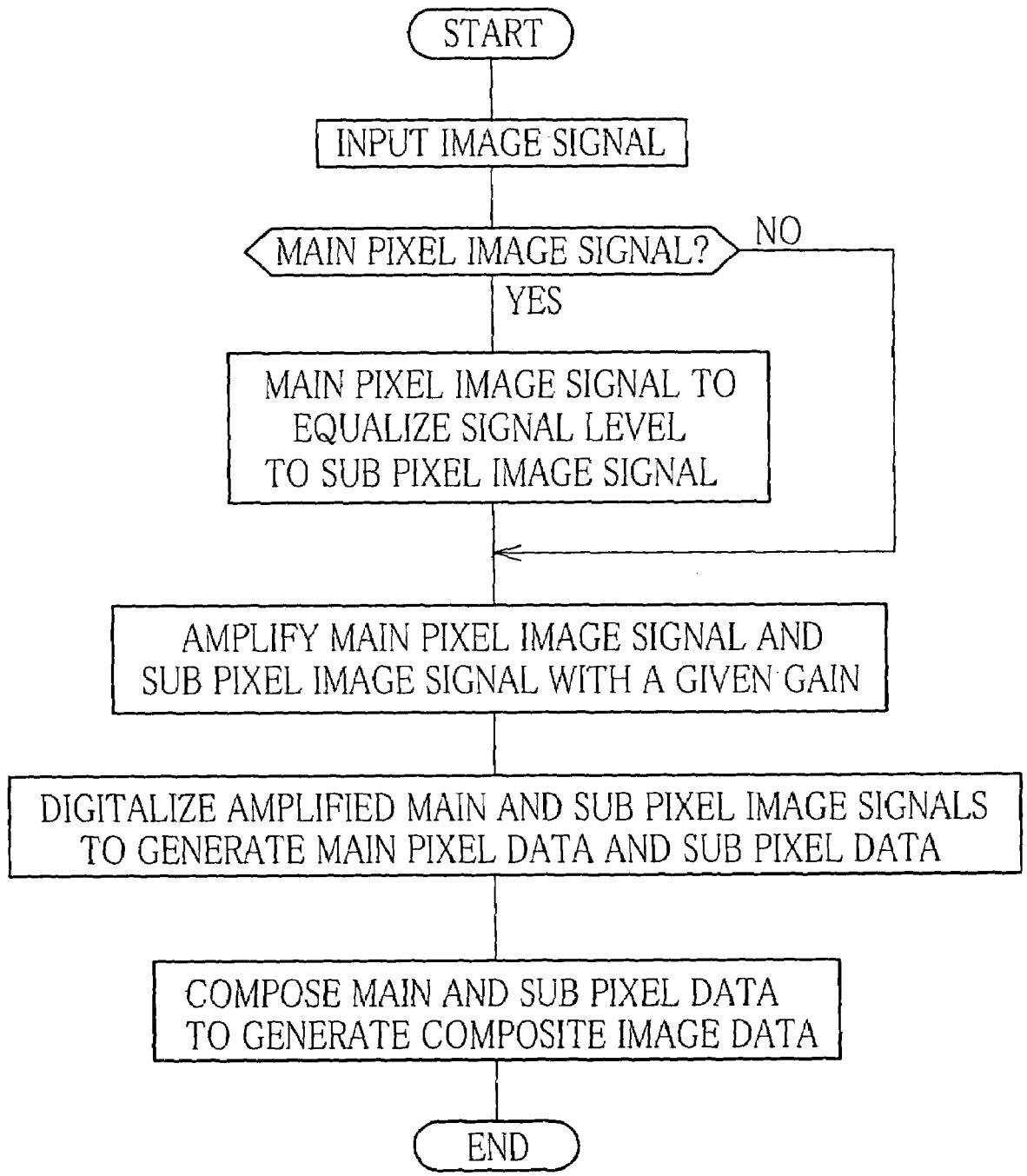
FIG. 5 is a flow chart illustrating a sequence for generating composite image data.

Now the operation of the present embodiment will be described with reference to the flow chart of FIG. 5.

When the digital camera 10 is set in the imaging mode, the digital camera 10 starts the shooting for the camera-through images. When the shutter button 15 is pressed in the imaging mode, the shooting of the camera-through images is interrupted, and the main shooting is executed to record an image frame on the memory card 21. After the main shooting is accomplished, the shooting for the camera-through images is restarted.

During the shooting, the charges stored in the main pixels 36a and those stored in the sub pixels 36b are fed as the main pixel image signals and the sub pixel image signals to the analog signal processing circuit 41. The separator 45 of the analog signal processing circuit 41 sends the main pixel image signals to the attenuator 47, and the sub pixel image signals to the amplifier 42. The attenuator 47 attenuates the main pixel image signals to have the same signal level as the sub pixel image signals, and then outputs them to the amplifier 42. The amplifier 42 amplifies the attenuated main pixel image signals and the sub pixel image signals with the given gain.

Since the main and sub pixel image signals are amplified after their signal levels are equalized, the signal levels of the two kinds of image signals will not differ from each other after the amplification, so the both kinds image signals can be amplified up to an adequate level by use of the same gain.

After being amplified, the image signals are digitalized, and the tonal values of both kinds of image signals are synthesized in the individual pixels, to generate the composite image data. Thanks to the high sensitive main pixels 36a, the composite image data reproduce fine gradations in the low brightness portions of the subject. Thanks to the low sensitive sub pixels 36b, the composite image data can also reproduce gradations in the high brightness portions of the subject, where the main pixels 36a reach the saturation level.

Although the charges stored in the main and sub pixels 36a and 36b are transferred through the common transfer paths 37 in the above embodiment, it is possible to provide a transfer path for the charges from the main pixels 36a separately from a transfer path for the charges from the sub pixels 36b. In that case, the separator 45 is unnecessary, and the main pixel image signals are sent directly to the attenuator 47, while the sub pixel image signals are sent to the amplifier 42.

In the present embodiment, the attenuator 47 attenuates the main pixel image signals to one fourth the original, on the assumption that the signal level of the main pixel image signals is four times that of the sub pixel image signals, because the saturation level of the main pixels 36a is four times that of the sub pixels 36b. But the present invention is not limited to this embodiment. For example, an average signal value of the individual pixels of the main pixel image signals may be defined as a signal level of the main pixel image signals, and an average signal value of the individual pixels of the sub pixel image signals may be defined as a signal level of the sub pixel image signals. Then the attenuation rate of the main pixel image signals is determined so as to equalize the signal level of the main pixel image signals to the signal level of the sub pixel image signals.

Figure 6:
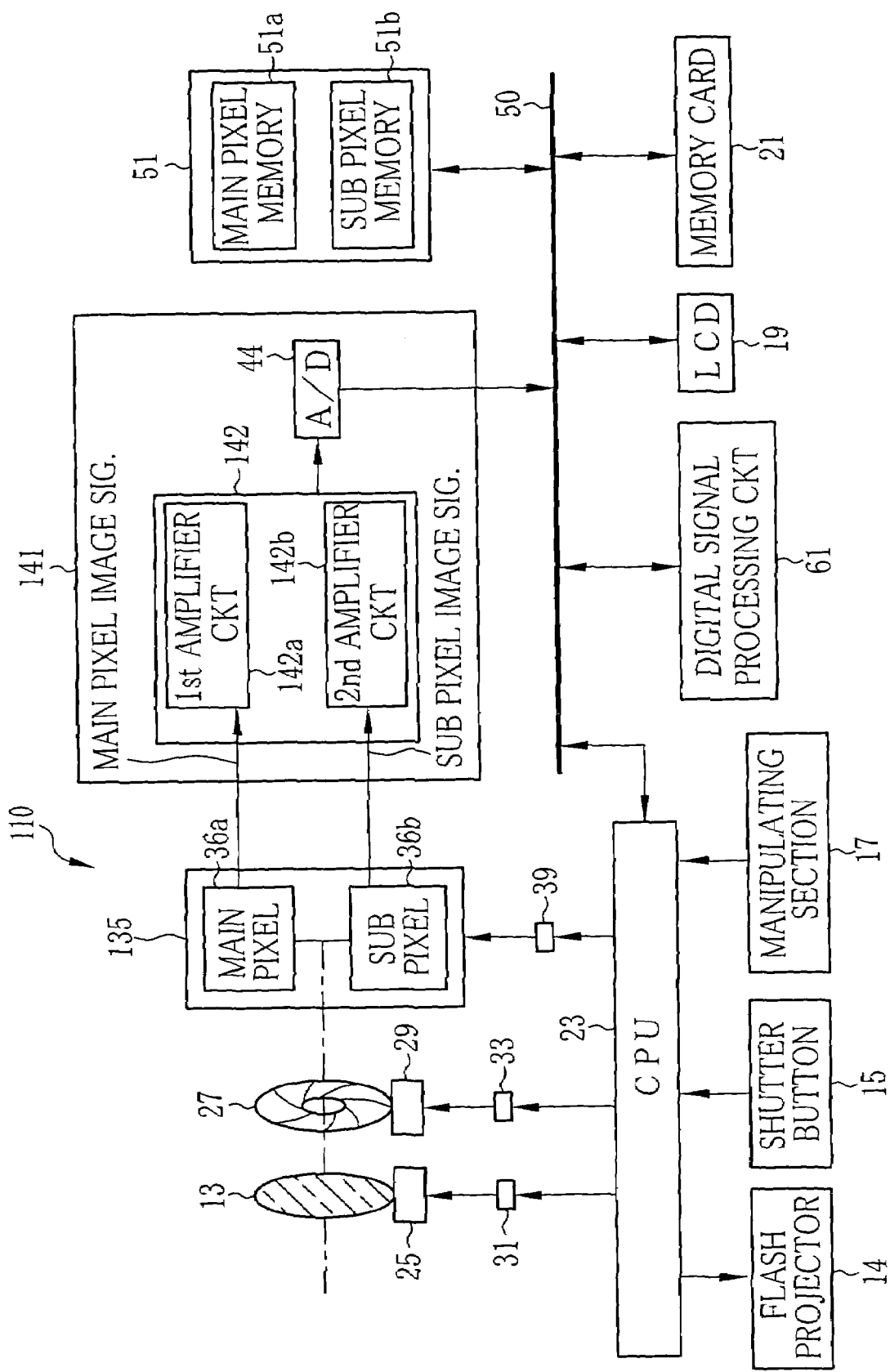
FIG. 6 is a block diagram illustrating a structure of a digital camera, according to a second embodiment of the present invention.

Now a second embodiment of the present invention will be described with reference to a digital camera 110 shown in FIGS. 6 and 7, wherein equivalent components are designated by the same reference numerals as in the first embodiment, so the description of these components will be omitted.

Figure 7:
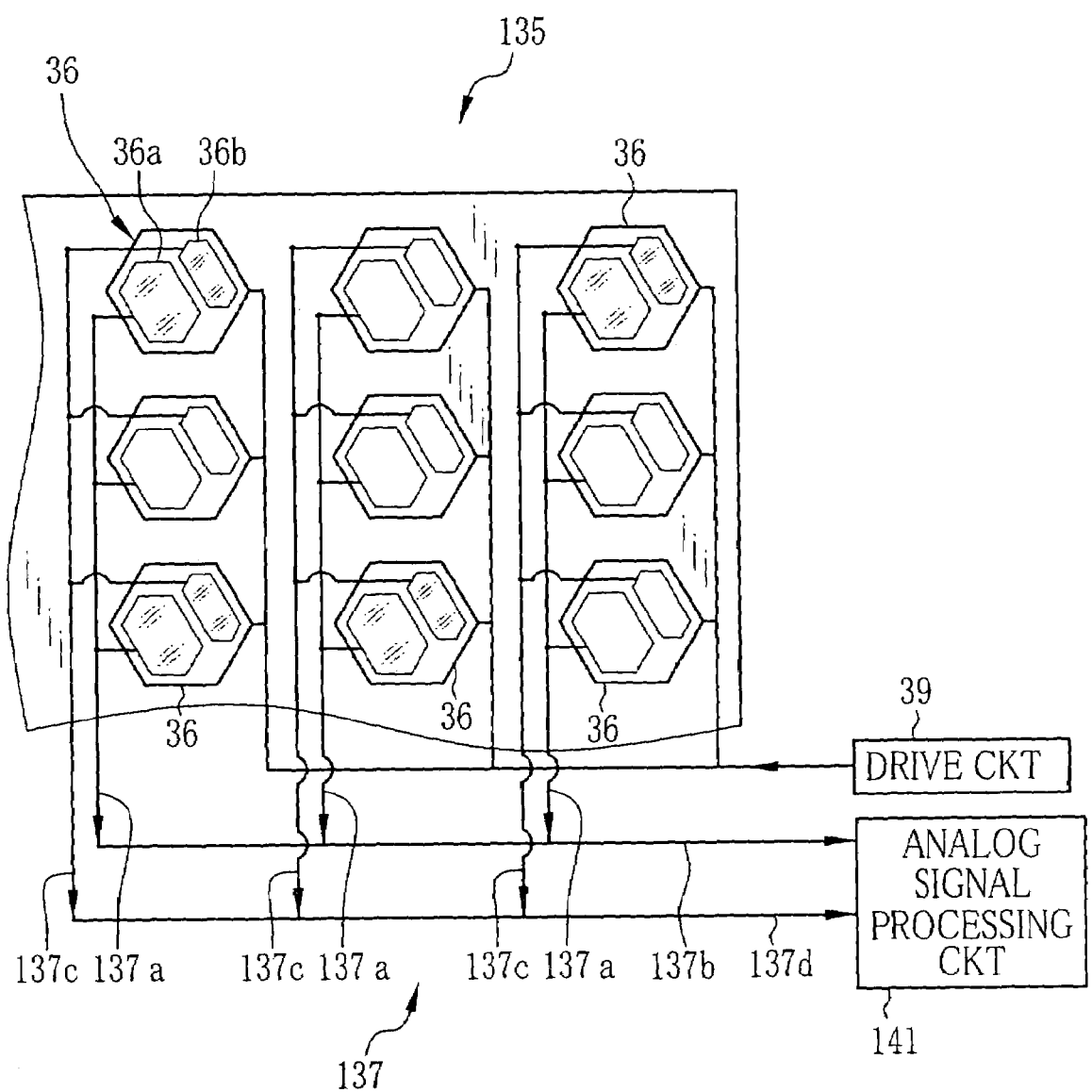
FIG. 7 is an explanatory diagram schematically illustrating a structure of a CCD used in the digital camera of FIG. 6.

As shown in FIG. 7, the digital camera 110 has a CCD 135 whose transfer paths 137 consist of vertical transfer paths 137a and a horizontal transfer path 137b for transferring the charges stored in main pixels 36a, and vertical transfer paths 137c and a horizontal transfer path 137d for transferring the charges stored in sub pixels 36b. Thus, the main pixel image signals and the sub pixel image signals are transferred separately to an analog signal processing circuit 141.

Referring back to FIG. 6, the analog signal processing circuit 141 is provided with an amplifier 142. The amplifier 142 amplifies the main and sub pixel image signals for the sake of reducing influence of noises on the following processes, and consists of a first amplifier circuit 142a for the main pixel image signals and a second amplifier circuit 142b for the sub pixel image signals.

The first amplifier circuit 142a is set up with a first gain, and is connected to the horizontal transfer path 137b through which the main pixel image signals are transferred from the main pixels 136a. So the first amplifier circuit 142a amplifies the main pixel image signals with the first gain. The second amplifier circuit 142b is set up with a second gain, and is connected to the horizontal transfer path 137d through which the sub pixel image signals are transferred from the sub pixels 136a. So the second amplifier circuit 142a amplifies the sub pixel image signals with the second gain. The first and second gains are determined to make the amplified main and sub pixel image signals have the same signal level.

As described with reference to FIG. 4, the saturation level of the main pixels 136a is four times that of the sub pixels 136b, so the main pixel image signals may have signal values whose range is four times wider than that of signal values of the sub pixel image signals. Therefore, in the present embodiment, the first gain is set at a value that is one fourth the second gain, on the assumption that the main pixel image signals have signal values whose range is four times wider than that of signal values of the sub pixel image signals, that is, the signal level of the main pixel image signal is four times that of the sub pixel image signal. Thereby, the signal levels of the amplified main and sub pixel image signals are equalized.

Since the main and sub pixel image signals are amplified with the different gains so as to equalize the signal levels of the two kinds of image signals, it becomes possible to amplify both image signals up to a proper level. The proper signal level depends on the camera specifications, but it is preferable to amplify the image signals as much as possible, insofar as the amplified image signals can be processed in the following sections, such as an A/D converter 44 and a digital signal processing circuit 61. This is because the influence of noises in the following processes is lessened, the larger the signal level of the image signals.

Figure 8:
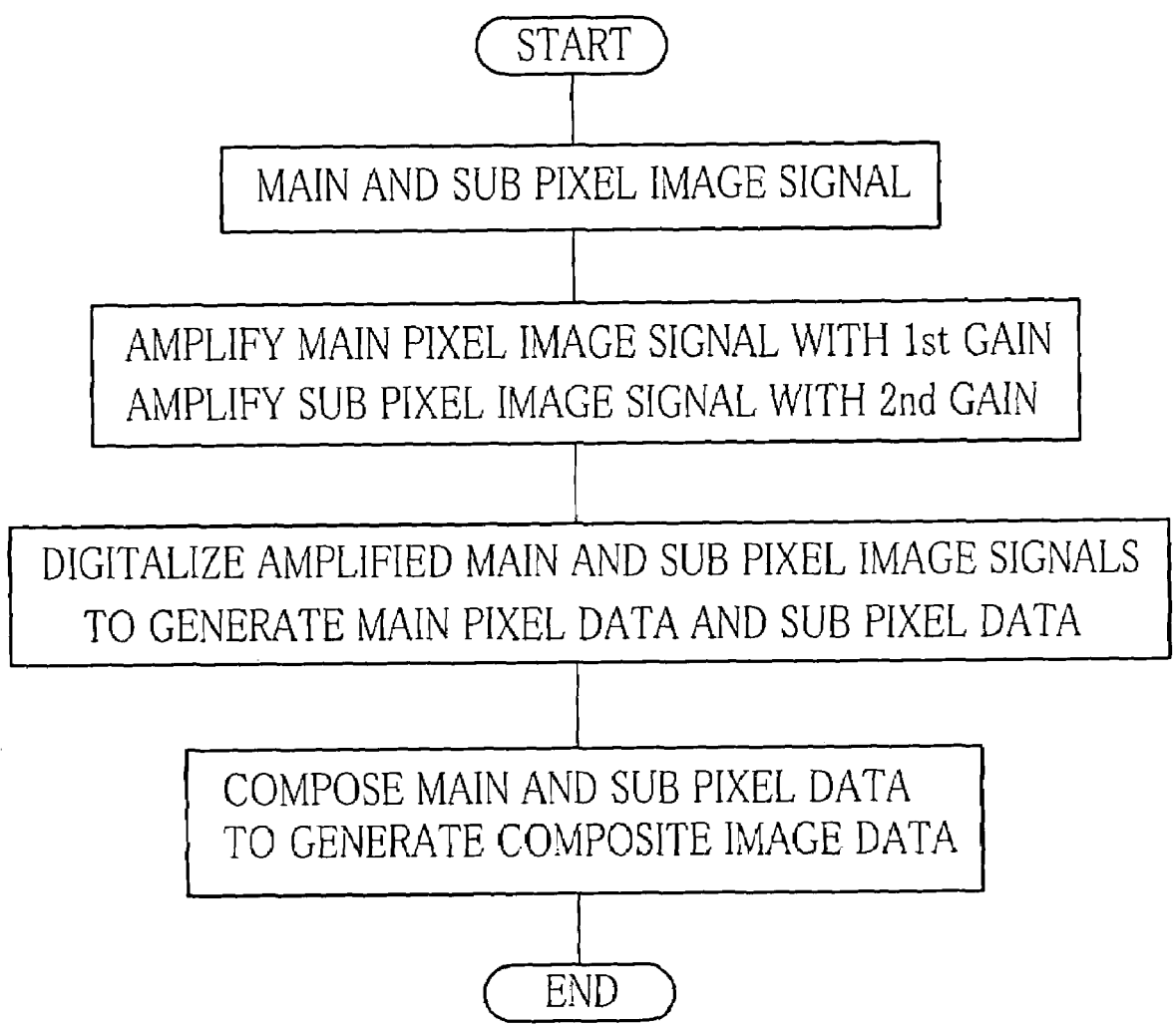
FIG. 8 is a flow chart illustrating a sequence for generating composite image data in the second embodiment.

FIG. 8 shows a flowchart illustrating a composite image data generation sequence according to the second embodiment.

During the shooting, the charges stored in the main pixels 136a are transferred through the vertical and horizontal transfer paths 137a and 137b, and fed as the main pixel image signals to the first amplifier circuit 142a, while the charges stored in the sub pixels 136b are transferred through the vertical and horizontal transfer paths 137c and 137d, and fed as the sub pixel image signals to the second amplifier circuit 142b. The main pixel image signals are amplified with the first gain in the first amplifier circuit 142a, and the sub pixel image signals are amplified with the second gain in the second amplifier circuit 142b. The first and second gains are determined to make the amplified main and sub pixel image signals have a proper signal level.

In the present embodiment, the first gain for amplifying the main pixel image signals is set at a value that is one fourth the second gain for amplifying the sub pixel image signal, on the assumption that the signal level of the main pixel image signals is four times that of the sub pixel image signals, because the saturation level of the main pixels 136a is four times that of the sub pixels 136b. But the present invention is not limited to this embodiment. For example, an average signal value of the individual pixels of the main pixel image signals may be defined as a signal level of the main pixel image signals, and an average signal value of the individual pixels of the sub pixel image signals may be defined as a signal level of the sub pixel image signals. Then the first and second gains are determined by calculation, so as to equalize the signal level of the main pixel image signals to the signal level of the sub pixel image signals.

Figure 9:
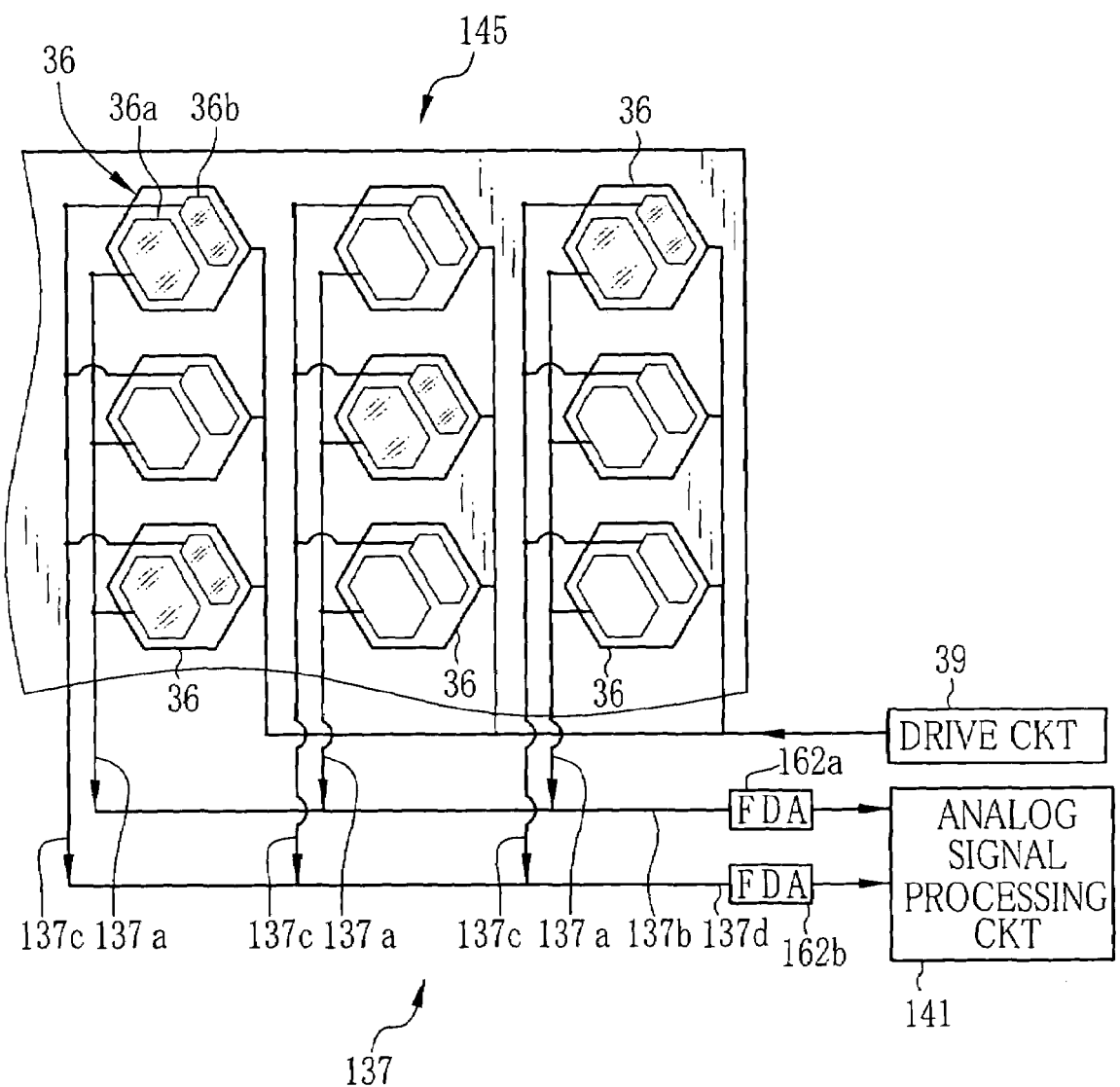
FIG. 9 is an explanatory diagram schematically illustrating a structure of a CCD having amplifiers integrated therein.

Although the image signals are amplified by the amplifier that is provided separately from the CCD in the above described embodiments, it is possible to integrate an amplifier with a CCD. In that case, as shown for example in FIG. 9, floating diffusion amplifiers (FDA) 162a and 162b are connected in horizontal transfer paths 137a and 137b of a CCD 145, which are provided for transferring the main pixel image signals and the sub pixel image signals separately from each other, so that the main pixel image signals are amplified by the FDA 162a, and that the sub pixel image signals are amplified by the FDA 162b.

As well known in the art, the FDAs 162a and 162b are based on a principal that an N-type region of a PN junction diode gets in an electrically floating condition when a reverse bias voltage is applied across the PN diode. Accordingly, as the charges are transferred into the PN junction diode, the voltage across opposite terminals varies in accordance with the capacity of the N-type region. The FDAs 162a and 162b outputs the voltage variation after amplifying it by a source follower that uses an MOS transistor with a high input impedance. Consequently, the FDAs 162a and 162b generate voltage signals corresponding to the charges stored in the individual pixels while amplifying the voltage signals. Because the gain of the FDA 162a or 162b varies in accordance with the capacity of the N-type region, it is possible to determine the gains of the FDAs 162a and 162b by adjusting capacity of the respective N-type regions, such that the amplified main and sub pixel image signals have the same signal level. Thus, the present embodiment achieves the same effect as the above described embodiments.

Figure 10:
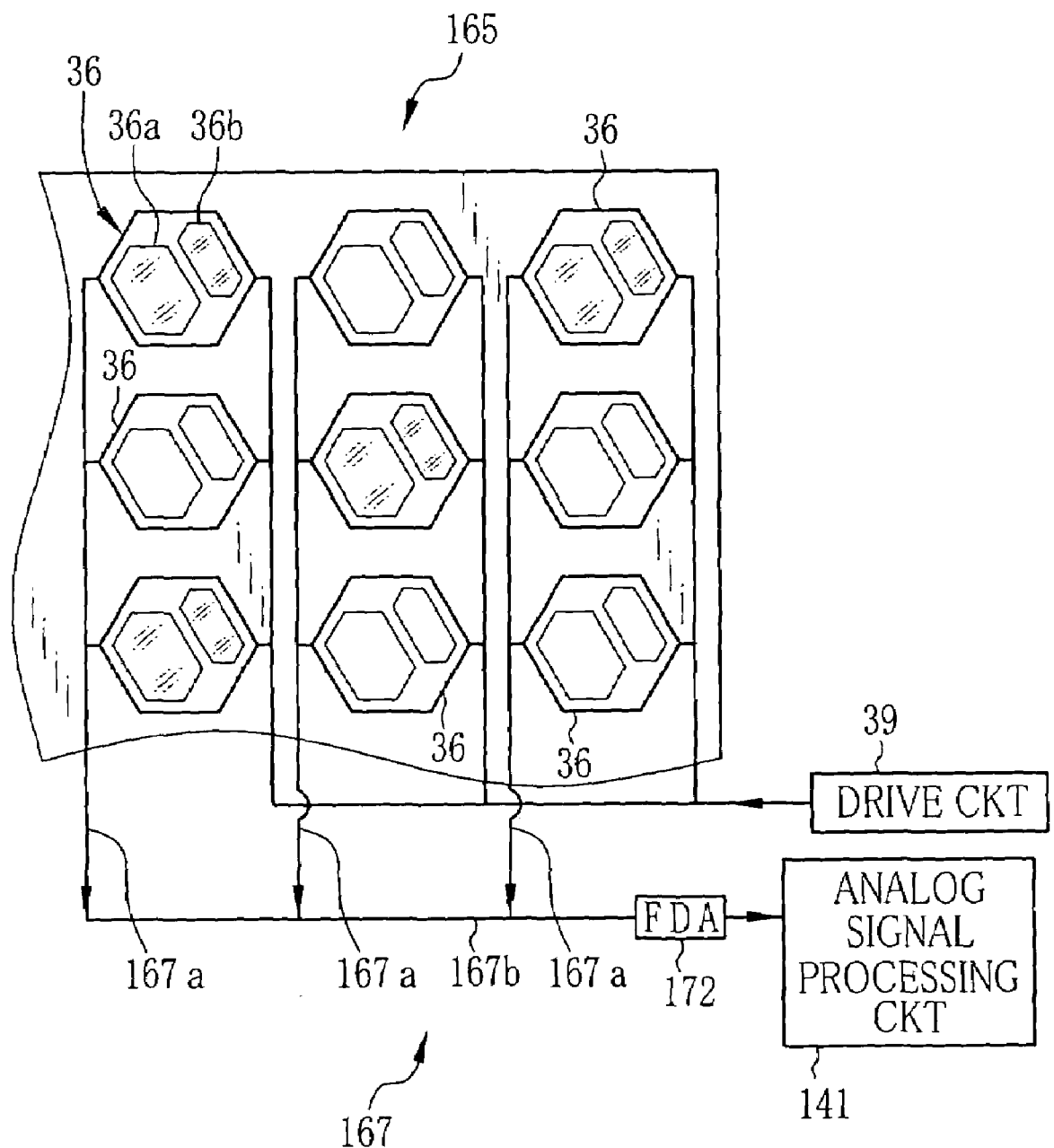
FIG. 10 is an explanatory diagram schematically illustrating a structure of a CCD having a single amplifier with variable gain that is connected in a common transfer path to the main and sub pixels.

In the second and third embodiments shown in FIGS. 6 to 9, the main pixel image signals are transferred separately from the sub pixel image signals, to amplify the two kinds of image signals respectively by the amplifier circuits 142*a* and 142*b* or the two FDAs 162*a* and 162*b*. But it is possible to transfer the main and sub pixel image signals through common transfer paths 167, as shown in FIG. 10, and amplify them by an FDA 172 whose gain is variable.

The transfer paths 167 consist of vertical transfer paths 167*a* and a horizontal transfer path 167*b*, so the charges stored in main and sub pixels 136*a* and 136*b* are transferred vertically through the vertical transfer paths 167*a* and, thereafter, transferred line by line through the horizontal transfer path 167*b*. The FDA 172 with variable gain is connected in the horizontal transfer path 167*b*, and amplifies the main pixel image signals from the main pixels 136*a* with a gain that is different from a gain used for amplifying the sub pixel image signals from the sub pixels 136*b*. The same effect as above is achieved by this configuration.

Instead of the FDA with variable gain, an amplifier with variable gain is usable. It is also possible to connect the transfer paths for the main pixels and the transfer paths for the sub pixels to an FDA with variable gain or a single amplifier with variable gain.

Although one main pixel and one sub pixel are integrated into one cell in the above embodiments, it is possible to provide the main pixels separately from the sub pixels.

Figure 11:
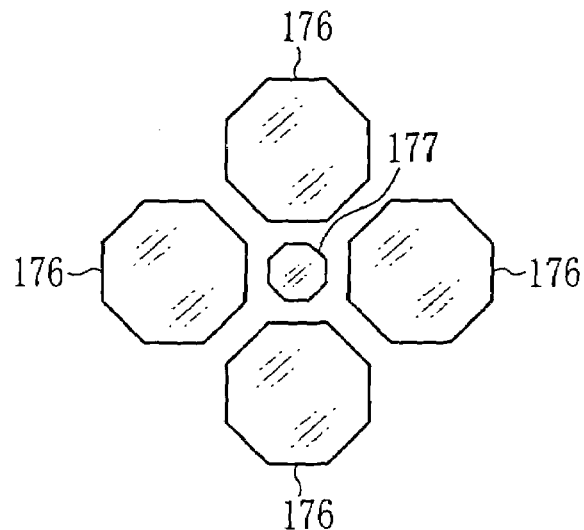
FIG. 11 is an explanatory diagram illustrating an example wherein the number of main pixels differ from the number of sub pixels.
Figure 12:
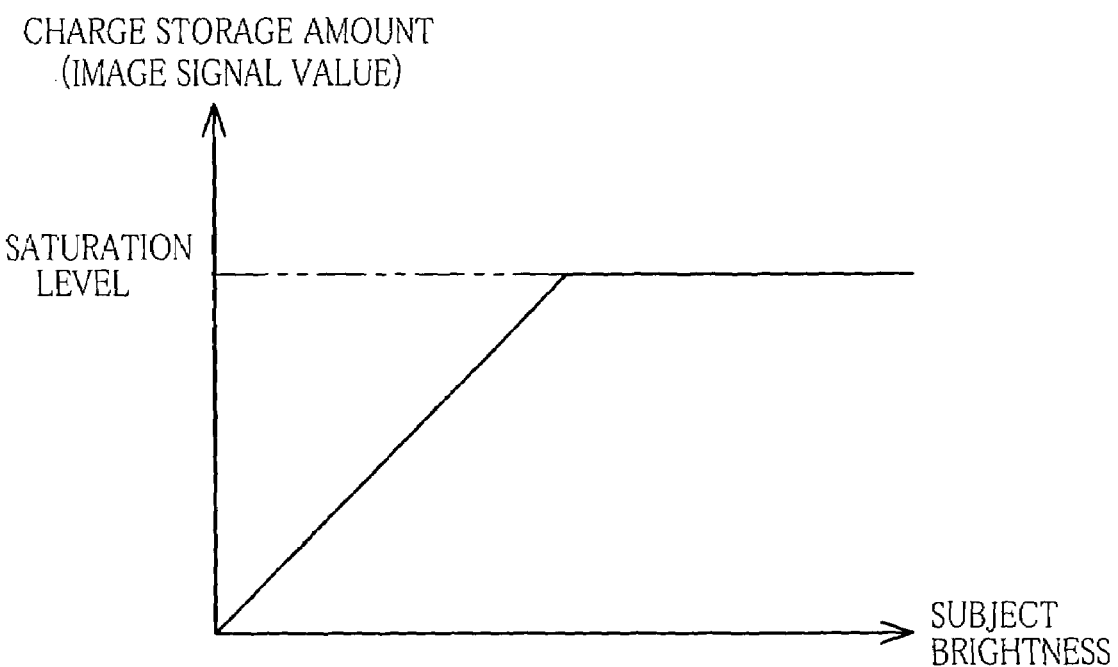
FIG. 12 is a graph illustrating a relationship between subject brightness and charge storage amount in a pixel of an imaging device.

In the above embodiments, the main pixels correspond to the sub pixels in one-to-one relationship, so that the composite image data is generated by composing the tonal value of each pixel of the main pixel data with the tonal value of the corresponding pixel of the sub pixel data. But as shown for example in FIG. 11, it is possible that one sub pixel 177 is allocated to a number of main pixels, four main pixels 176 in this case, to constitute one cell. Such cells are arranged in an array to constitute a CCD. In that case, a tonal value obtained from one sub pixel 177 is composed with tonal values obtained from the four main pixels 176 of the same cell, to generate composite image data. In this way, the present invention is applicable to a CCD where the number of main pixels differ from the number of sub pixels.

Although the above described embodiments have been described with respect to a case where the sensitivity of the main pixels is 16 times that of the sub pixels, and the saturation level of the main pixels is four times that of the sub pixels, the present invention is not to be limited to these numerical values. The main pixels and the sub pixels may be modified appropriately.

Although the present invention has been described with reference to a digital camera, the present invention is applicable to other imaging apparatuses, such as a camera phone, a video camera and an image scanner.

Thus the present invention is not to be limited to the above embodiments but, on the contrary, various modifications will be possible without departing from the scope of claims appended hereto.

What is claimed is:

1. An imaging apparatus comprising:
an imaging device that has high sensitive main pixels and low sensitive sub pixels, to take analogue main pixel image signals from electric charges stored in said main pixels, and analogue sub pixel image signals from electric charges stored in said sub pixels;
an analogue signal processing device that amplifies or attenuates said analogue main pixel image signals and/or said analogue sub pixel image signals, to put signal values of said analogue main pixel image signals and said analogue sub pixel image signals substantially in the same range;
an A/D converter for converting said analogue main pixel image signals and said analogue sub pixel image signals, after being amplified or attenuated in said analogue signal processing device, to main pixel data and sub pixel data respectively; and
an image composition device for composing said main and sub pixel data to generate composite image data,
wherein said analogue signal processing device comprises an attenuator for attenuating said analogue main pixel image signals or said analogue sub pixel image signals, to put signal values of said analogue main pixel image signals and said analogue sub pixel image signals substantially in the same range; and an amplifier for amplifying said analogue main pixel image signals and said analogue sub pixel image signals, after having the signal values put in the same range, with a predetermined gain.

2. The imaging apparatus as claimed in claim 1, wherein said main pixels have a higher saturation level to store charges up to a larger amount than said sub pixels, and said analogue signal processing device attenuates said analogue main pixel image signals by said attenuator.

3. The imaging apparatus as claimed in claim 2, wherein said imaging device comprises a first transfer path for transferring charges stored in said main pixels and a second transfer path for transferring charges stored in said sub pixels, and wherein said first transfer path is connected to said attenuator, and said second transfer path and an output of said attenuator are connected to said amplifier.

4. The imaging apparatus as claimed in claim 1, wherein said imaging device comprises a common transfer path for transferring charges from said main pixels and said sub pixels, and said analogue signal processing device is connected to said common transfer path.

5. The imaging apparatus as claimed in claim 4, wherein said analogue signal processing device comprises a separator for separating said analogue main pixel image signals from said analogue sub pixel image signals.

* * * * *